United States Patent
Lefevre et al.

(10) Patent No.: US 8,675,972 B2
(45) Date of Patent: Mar. 18, 2014

(54) METHOD AND DEVICE FOR DETERMINING THE POSE OF A THREE-DIMENSIONAL OBJECT IN AN IMAGE AND METHOD AND DEVICE FOR CREATING AT LEAST ONE KEY IMAGE FOR OBJECT TRACKING

(75) Inventors: Valentin Lefevre, Puteaux (FR); Nicolas Livet, Paris (FR)

(73) Assignee: Total Immersion, Suresnes (FR)

(*) Notice: Subject to any disclaimer, the term of this patent is extended or adjusted under 35 U.S.C. 154(b) by 319 days.

(21) Appl. No.: 12/528,418

(22) PCT Filed: Feb. 22, 2008

(86) PCT No.: PCT/FR2008/000236
§ 371 (c)(1),
(2), (4) Date: Aug. 24, 2009

(87) PCT Pub. No.: WO2008/125754
PCT Pub. Date: Oct. 23, 2008

(65) Prior Publication Data
US 2010/0316281 A1    Dec. 16, 2010

(30) Foreign Application Priority Data
Feb. 23, 2007  (FR) ..................... 07 53482

(51) Int. Cl.
*G06K 9/62* (2006.01)
(52) U.S. Cl.
USPC ........... 382/216; 382/103; 382/118; 382/154; 382/209; 382/285
(58) Field of Classification Search
None
See application file for complete search history.

(56) References Cited

U.S. PATENT DOCUMENTS

| | | | | |
|---|---|---|---|---|
| 6,671,391 | B1 * | 12/2003 | Zhang et al. | 382/118 |
| 2004/0038450 | A1 * | 2/2004 | King et al. | 438/107 |
| 2007/0122001 | A1 * | 5/2007 | Wang et al. | 382/103 |
| 2007/0269080 | A1 * | 11/2007 | Hamanaka | 382/106 |

OTHER PUBLICATIONS

Basri et al., "Distance Metric Between 3D Models and 2D Images for Recognition and Classification", Apr. 1996, IEEE Transactions on Pattern Analysis and Machine Intellignece, vol. 18, No. 4, pp. 465-470.*

Yang et al., "Model-based Head Pose Tracking With Stereovision", 2002, IEEE Computer Society, Proceedings of the Fifth IEEE Conference on Automatic Face and Festure Recognition, pp. 1-6.*

Akamatsu et al., "A new method for designing face image classifiers using 3D CG model", Nov. 1991, SPIE, vol. 1606 Visual Communications and Image Processing '91: Image Processing, pp. 204-216.*

(Continued)

*Primary Examiner* — Jason M Repko
*Assistant Examiner* — David Perlman
(74) *Attorney, Agent, or Firm* — Blue Capital Law Firm, P.C.

(57) ABSTRACT

The invention relates to a method and a device for determining the exposure of a three-dimensional object in an image, characterised in that it comprises the following steps: acquiring a three-dimensional generic model of the object, projecting the three-dimensional generic model according to at least one two-dimensional representation and associating to each two-dimensional representation an exposure information of the three-dimensional object, electing and positioning a two-dimensional representation onto the object in said image, and determining the three-dimensional exposure of the object in the image from at least the exposure information associated with the selected two-dimensional representation.

16 Claims, 7 Drawing Sheets

(56) References Cited

OTHER PUBLICATIONS

V. Lepetit, et al, "Fully automated and stable registration for augmented reality applications", Proceedings of the Second IEEE and ACM International Symposium on Mixed and Augmented Reality, Oct. 7, 2003, p. 93-102, IEEE.

L. Vacchetti, et al, "Stable Real-Time 3D Tracking Using Online and Offline Information" IEEE Transactions on Pattern Analysis and Machine Intelligence, Oct. 2004, p. 1385-1391, vol. 26, No. 10, IEEE Computer Society.

G. Bleser, et al, "Real-time 3D Camera,Tracking for Industrial Augmented Reality Applications", WSCG. International Conference in Central Europe on Computer, Graphics, Visualization, XX, XX, Jan. 31, 2005, p. 47-54.

V. Lepetit, et al, "Monocular Model-Based 3D Tracking of Rigid Objects: A Survey", Foundations and Trends in Computer, Graphics and Vision, 2005, p. 1-89, vol. 1, No. 1, Now Publishers Inc. ,Hanover, MA, US.

* cited by examiner

METHOD AND DEVICE FOR DETERMINING THE POSE OF A THREE-DIMENSIONAL OBJECT IN AN IMAGE AND METHOD AND DEVICE FOR CREATING AT LEAST ONE KEY IMAGE FOR OBJECT TRACKING

The present invention concerns the combination of real and virtual images in real time, also known as augmented reality, and more particularly a method and a device for determining the pose of a three-dimensional object in an image and a method and a device for creating at least one key image corresponding to a three-dimensional object.

The object of augmented reality is to insert one or more virtual objects into the images of a video stream. Depending on the type of application, the position and orientation of these virtual objects can be determined by data external to the scene represented by the images, for example coordinates obtained directly from a game scenario, or by data linked to certain elements of the scene, for example coordinates of a particular point in the scene such as the hand of a player. If the position and orientation are determined by data linked to certain elements of the scene, it may be necessary to track those elements as a function of movements of the camera or movements of those elements themselves within the scene. The operations of tracking elements and embedding virtual objects in real images can be executed by separate computers or by the same computer.

There exist a number of methods for tracking elements in an image stream. Element tracking algorithms, also called target pursuit algorithms, generally use a marker, which can be a visual marker, or other means such as radio-frequency or infrared. Alternatively, some algorithms use shape recognition to track a particular image in an image stream.

The Ecole Polytechnique Fédérale de Lausanne has developed a visual tracking algorithm using no marker and the novelty of which lies in matching particular points in the current image of a video stream and a key image, called a keyframe, provided by the user on initialization of the system and in a key image updated during the visual tracking.

The objective of this visual tracking algorithm is to find, in a real scene, the pose, i.e. the position and orientation, of an object for which the three-dimensional meshing is available, or to find extrinsic position and orientation parameters relative to that object from an immobile camera filming that object, thanks to image analysis.

The current video image is compared with one or more stored key images to find a large number of matches between those pairs of images in order to estimate the pose of the object. To this end, a key image is composed of two elements: an image captured from the video stream and a pose (orientation and position) of a three-dimensional model appearing in that image. It is necessary to distinguish between "offline" key images and "online" key images. Offline key images are images extracted from the video stream in which the object to be tracked has been placed manually using a pointing device such as a mouse or using an adjustment tool such as a Pocket Dial sold by the company Doepfer. Offline key images characterize preferably the pose of the same object in a number of images. They are created and stored "offline", i.e. outside the ongoing regime of the application. Online images are stored dynamically during execution of the tracking program. They are calculated when the error, that is to say the distance between the matches of the points of interest, is low. Online key images replace offline key images used to initialize the application. Their use aims to reduce the offset, also known as drift, that can become large on moving too far from the initial relative position between the camera and the object. Learning new online key images also makes the application more robust to external light variations and to camera colorimetry variations. However, they have the disadvantage of introducing a "vibration" effect into the pose of the object in time. On learning a new online key image, the latter image replaces the preceding offline or online key image. It is used as the current key image.

Each offline or online key image includes an image in which the object is present and a pose for characterizing the placement of that object and a number of points of interest that characterize the object in the image. For example, the points of interest are constructed using a Harris point detector and represent locations in the image with high directional gradient values.

Before initializing the application, it is necessary to determine one or more offline key images. These are generally images extracted from the video stream, that contain the object to be tracked and associated with a position and an orientation of the three dimensional model of that object. To this end, an operator carries out a manual operation that consists in visually matching a wire model to the real object. The manual preparation phase therefore consists in finding a first estimate of the pose of the object in an image extracted from the video stream, which amounts to formalizing the initial affine transformation $T_{p \to c}$ that corresponds to the matrix for passing between the frame of reference attached to the object and the frame of reference associated with the camera. The initial affine transformation can be divided into a first transformation $T_{o \to c}$, relating to an initial position of the object, for example at the center of the screen, i.e. a transformation linked to the change of frame of reference between the frame of reference of the camera and the frame of reference of the object, and a second transformation $T_{p \to o}$ relating to the displacement and rotation of the object from its initial position at the center of the screen to the position and orientation in which the object is really located in the key image, where $T_{p \to c} = T_{p \to o} \cdot T_{o \to c}$. If the values α, β and γ correspond to the translation of the object from its initial position at the center of the image to its position in the key image and if the values θ, φ and ϕ correspond to the rotation of the object from its initial position at the center of the image to its position in the key image about the axes x, y and z, the transformation $T_{p \to o}$ can then be expressed in the form of the following matrix:

$$T_p^o = \begin{bmatrix} \cos\varphi\cos\phi + \sin\varphi\sin\theta\sin\phi & \sin\varphi\cos\phi - \cos\varphi\sin\theta\sin\phi & \cos\theta\sin\phi & \alpha \\ -\sin\varphi\cos\theta & \cos\varphi\cos\phi & \sin\theta & \beta \\ \sin\varphi\sin\theta\cos\phi - \cos\varphi\sin\phi & -\cos\varphi\sin\theta\cos\phi - \sin\varphi\sin\phi & \cos\theta\cos\phi & \gamma \\ 0 & 0 & 0 & 1 \end{bmatrix}$$

Using this model establishes the link between the coordinates of points of the three-dimensional model of the object expressed in the frame of reference of the object and the coordinates of those points in the frame of reference of the camera.

On initialization of the application, the offline key images are processed to position points of interest as a function of the parameters chosen on launching the application. Those parameters are specified empirically for each type of use of the application, modulate the match detection core and produce better quality in estimating the pose of the object according to the characteristics of the real environment. Then, if the real object in the current image is in a pose that is close to the pose of that same object in one of the offline key images, the number of matches becomes high. It is then possible to find the affine transformation for keying the virtual three-dimensional model of the object to the real object.

When such a match has been found, the algorithm goes to the ongoing regime. Displacements of the object are tracked from one frame to the other and any drift is compensated using information contained in the offline key image retained at initialization time and in the online key image calculated during execution of the application.

The tracking application combines two types of algorithm: detection of points of interest, for example a modified version of Harris point detection, and a technique of reprojection of the points of interest positioned on the three-dimensional model to the image plane. This reprojection predicts the result of spatial transformation from one frame to another. These two algorithms when combined provide for robust tracking of an object according to six degrees of freedom.

Generally speaking, a point p of the image is the projection of a point P of the real scene where $p \sim P_I \cdot P_E \cdot T_{p \to c} \cdot P$ where $P_I$ is the matrix of the intrinsic parameters of the camera, i.e. its focal value, the center of the image and the offset, $P_E$ is the matrix of the extrinsic parameters of the camera, i.e. the position of the camera in the real space, and $T_{p \to c}$ is the affine matrix for passing between the frame of reference associated with the tracked object and the frame of reference of the camera. Only the relative position of the object relative to the relative position of the camera is considered here, which amounts to placing the frame of reference of the real scene at the optical center of the camera. This produces the equation $p \sim P_I \cdot T_{p \to c} \cdot P$ where $T_{p \to c}$ is the matrix of the pose of the object in the frame of reference of the camera. The matrix $P_I$ being known, the tracking problem therefore consists in determining the matrix $T_{p \to c}$.

However, it is important to note that if the error measurement gets too high, i.e. if the number of matches between the current key image and the current image gets too small, tracking is desynchronized (the estimate of the pose of the object is considered to be no longer sufficiently coherent) and a new initialization phase using the same offline key images is necessary.

The pose of an object is estimated according to the matches between the points of interest of the current image from the video stream, the points of interest of the current key image and the points of interest of the preceding image from the video stream. These operations are referred to as the matching phase. From the most significant correlations, the software calculates the pose of the object corresponding best to the observations.

FIGS. 1 and 2 illustrate this tracking application.

The solutions proposed often stem from research and do not take into account the constraints of building commercial systems. In particular, problems linked to robustness, to the possibility of launching the application quickly without necessitating a manual phase of creation of one or several offline key images necessary for initialization of the tracking system, for detection of "desynchronization" errors (when an object to be tracked is "lost") and for automatic reinitialization in real time after such errors are often ignored.

The invention solves at least one of the problems described above.

The invention therefore consists in a method for determining the pose of a three-dimensional object in an image, characterized in that it comprises the following steps:
- acquisition of a generic three-dimensional model of the object,
- projection of the generic three-dimensional model as at least one representation in two dimensions and association with each representation in two dimensions of information on the pose of the three-dimensional object,
- selection and positioning of a representation in two dimensions on the object in said image,
- determination of the three-dimensional pose of the object in the image from at least the pose information associated with the selected representation in two dimensions.

Thus the method of the invention automatically determines the pose of a three-dimensional object in an image, in particular with a view to creating initialization key images of an augmented reality application using automatic tracking, in real time, of three-dimensional objects in a video stream. This determination is based on the acquisition of a model of the object and the projection of the latter as at least one representation in two dimensions, and then positioning a representation of the object in the image in order to determine its pose.

According to one particular feature, the method comprises a preliminary step of construction of a generic three-dimensional model of the object from the three-dimensional object.

According to one particular feature, the generic three-dimensional model is a meshing of the object.

In one embodiment the method comprises a preliminary step of location in three dimensions of the object in the image.

This feature facilitates the positioning of a representation in two dimensions of the object in the image.

In another embodiment, the method comprises a step of determination of the characteristic points of the object of the image.

This feature facilitates the positioning of a representation in two dimensions of the object in the image and the determination of the three-dimensional pose of an object in an image when a representation in two dimensions is positioned.

According to one particular feature, the method comprises a preliminary step of determination of characteristic points of the generic three-dimensional model of the object.

According to this feature, the positioning of a representation in two dimensions is facilitated as is the determination of the three dimensional pose of an object in an image when a representation in two dimensions is positioned.

According to another particular feature, the step of determination of the three-dimensional pose of the object in the image is furthermore a function of the distance between the characteristic points of the generic three-dimensional model of the object so determined and the characteristic points of the object in the image so determined.

The invention also consists in a method of creation of at least one key image comprising an image representing at least one three-dimensional object in a three-dimensional environment, that method being characterized in that it comprises the following steps:
- acquisition of at least one image representing the object in a particular initial position;
- determination of the pose of the three-dimensional object in said at least one image by the method of the invention of determination of the pose of a three-dimensional object in an image, and creation of at least one key image from said at least one image acquired and the relative pose of the object in its environment.

Thus the method of the invention automates the creation of key images, in particular with a view to initializing or reinitializing an augmented reality application using automatic tracking, in real time, of three-dimensional objects in a video stream.

The invention further consists in a device for determining the pose of a three-dimensional object in an image, characterized in that it comprises the following means:
- means for acquisition of a generic three-dimensional model of the object,
- means for projection of the generic three-dimensional model as at least one representation in two dimensions and means for association with each representation in two dimensions of information on the pose of the three-dimensional object,
- means for selection and means for positioning of a representation in two dimensions on the object in said image,
- means for determination of the three-dimensional pose of the object in the image from at least the pose information associated with the selected representation in two dimensions.

Similarly, the invention proposes a device for creation of at least one key image comprising an image representing at least one three-dimensional object in a three-dimensional environment, the device being characterized in that it comprises the following means:
- means for acquisition of at least one image representing the object in a particular initial position;
- means for determination of the pose of the three-dimensional object in said at least one image conforming to the device for determination of the pose of a three-dimensional object in an image, and
- means for creation of at least one key image from said at least one image acquired and the relative pose of the object in its environment.

These devices have the same advantages as the methods briefly described hereinabove which are therefore not repeated here.

The present invention also consists in removable or non-removable storage means partially or totally readable by a computer or a microprocessor and including code instructions of a computer program for executing each of the steps of the methods described above.

The present invention finally consists in a computer program including instructions adapted to execute each of the steps of the methods described above.

Other advantages, objects and features of the present invention emerge from the following detailed description given by way of nonlimiting example with reference to the appended drawings, in which.

A particular object of the method of the invention is to create, in particular automatically, at least one key image of at least one three-dimensional object in an environment with a view to automating initialization and reinitialization phases following desynchronization of the object tracking application and images from a video stream.

In one embodiment, one key image is sufficient to automate the initialization and reinitialization phases, especially when the pose of the object in an image is found in real time and very accurately by means of image analysis.

A multitude of key images can nevertheless also enables initialization of the application for any type of relative pose between the object to be tracked and the camera.

Figure 1:
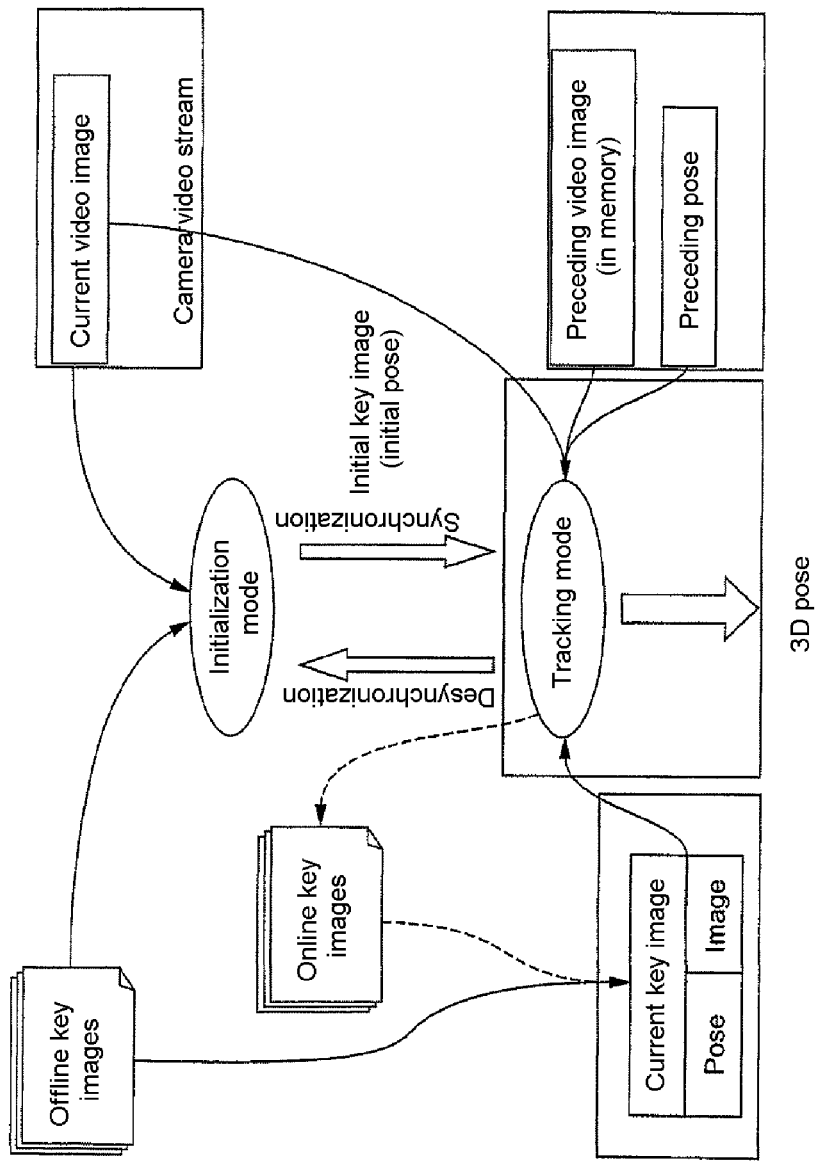
FIG. 1 represents diagrammatically the essential principles of the object tracking application developed by the Ecole Polytechnique Fédérale de Lausanne.
Figure 2:
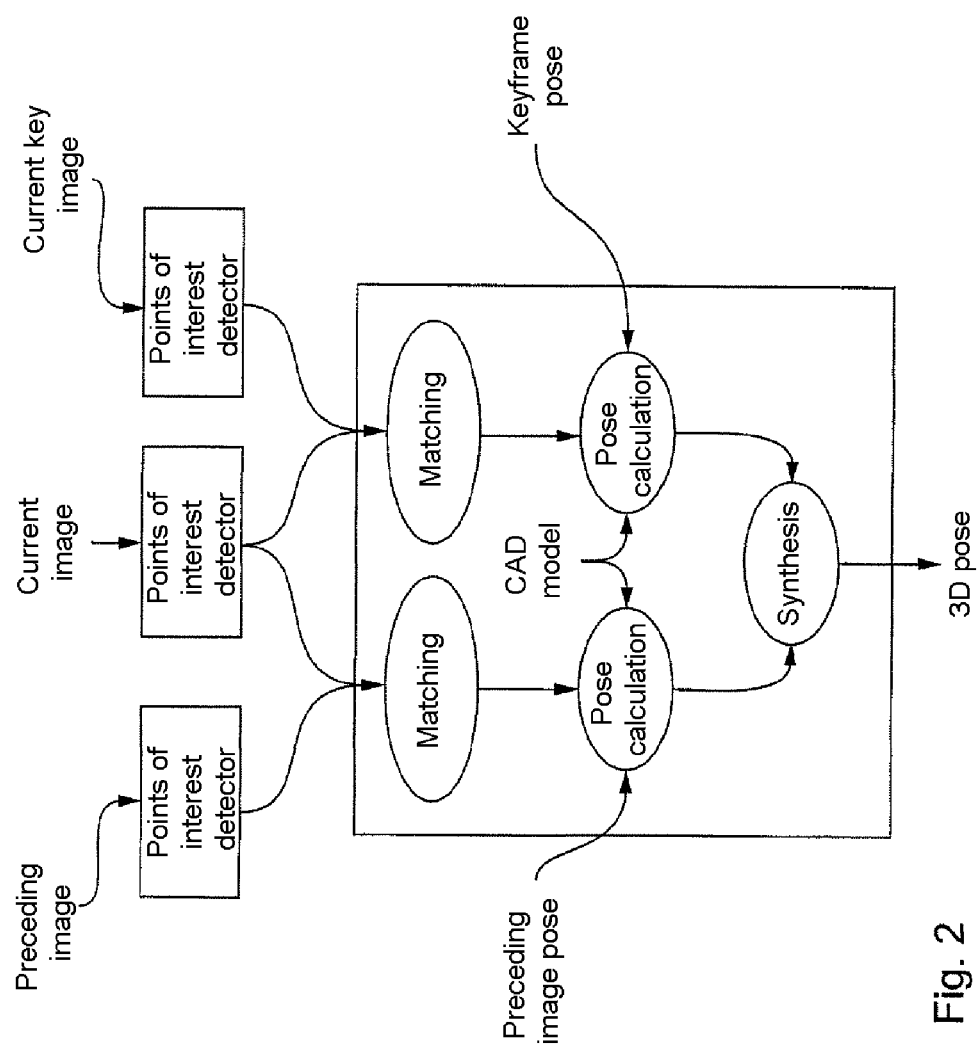
FIG. 2 illustrates certain steps of the method for determining the pose of an object in an image from a video stream from key images and the preceding image from the video stream.
Figure 3:
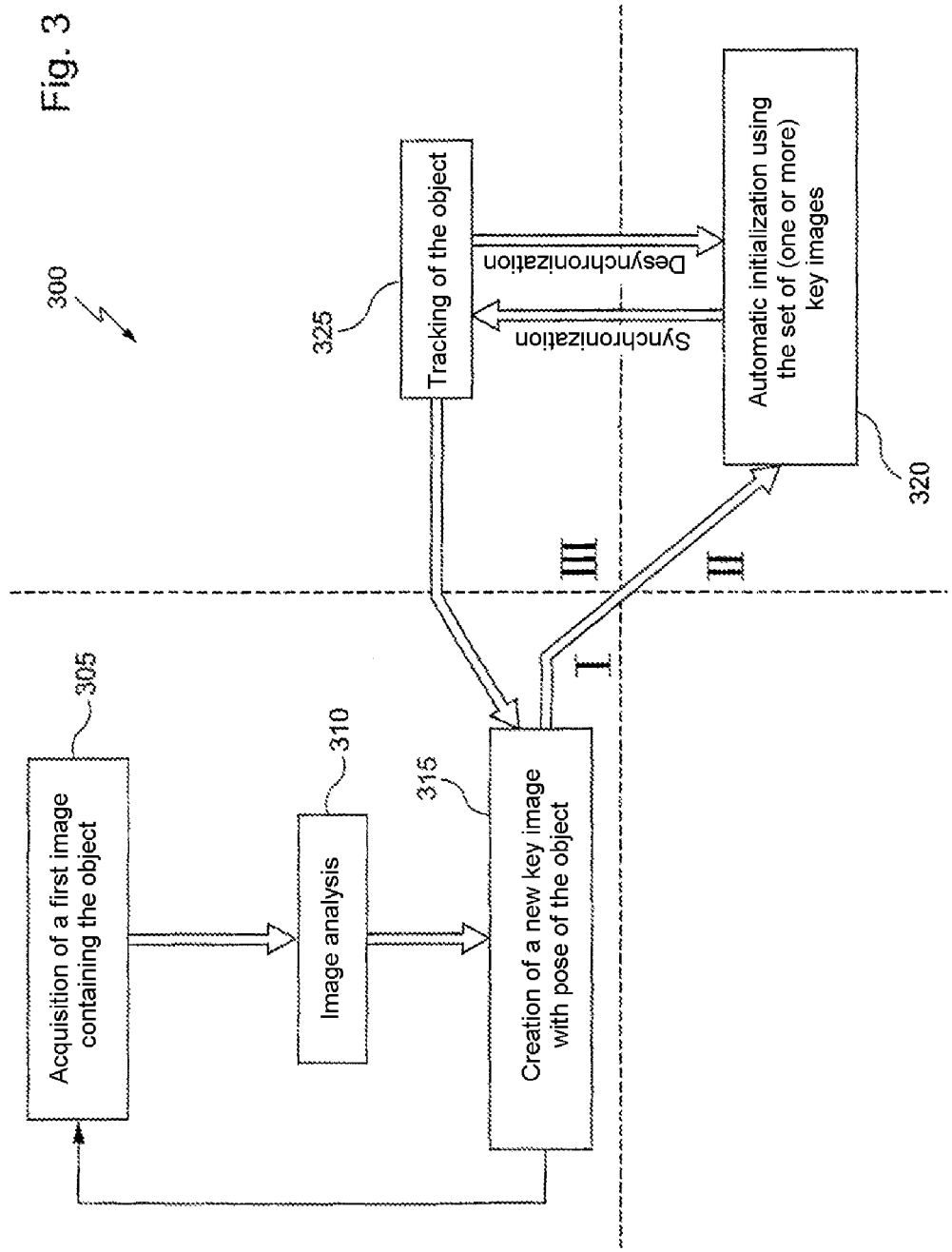
FIG. 3 represents a general diagram of the creation of one or more key images of a three-dimensional object of any geometry in an environment using the invention.

FIG. 3 shows the overall scheme for creation of one or more key images, also known as initialization key images, of an object in an environment, using the invention, for an object tracking application.

As shown in FIG. 3, the creation of at least one key image of an object in an environment and the execution of a tracking application (300) using those key images comprises three interconnected phases: a phase (I) of creating one or several initialization key images, a tracking initialization phase (II) that uses the key image or images previously created, and an object tracking phase (III) that corresponds to the ongoing regime of the application and can be used to create new initialization key images.

The phase (I) of creating a first key image consists principally in the acquisition of an image representing the three-dimensional object in an initial position. This acquisition is effected, in particular, using imaging means such as a video camera or a still camera. Having acquired the image containing the three-dimensional object (step 305), a first key image is created (step 320) comprising on the one hand the acquired first image and the relative pose of the object in the environment according to the viewpoint of the image. Conventionally, to construct this first key image, it is necessary to place the three-dimensional meshing corresponding to the object on the latter in the image by hand. This step is tedious, however.

The invention therefore introduces an image analysis module prior to creation of the key image (step 310) and finds the pose of the object in the image without user intervention. To this end, an in accordance with the invention, a prior knowledge of the type of object to find in the image and a knowledge of a few characteristics thereof enable estimation of the pose of the object in the real space.

This approach is particularly beneficial when it is a question of retrieving the pose of a face in an image, for example. It is possible to use features of the face such as the eyes or the mouth to determine the pose of the object.

To make the tracking algorithm more robust, it is sometimes important to capture a series of key images corresponding to a plurality of relative poses between the camera and the object.

Accordingly, the steps of this phase I can be iterated to create a plurality of key images without necessitating user intervention.

During the initialization phase (II), from one or more initialization key images created during phase I, the tracking application is initialized by searching for a key image representing the object in the video stream containing the object to be tracked (step 320).

When the pose of the object is determined in the first image from the video stream and the current key image has been constructed (step 320), the tracking application can find the object (phase III) in the successive images of the video stream using a tracking mechanism (step 325). According to this mechanism, displacements of the object (displacement of the object in the scene or displacement induced by the movement of the camera in the scene) are tracked from one frame to another and any drift compensated using information contained in the initialization key image retained at initialization time and, where applicable, in the initialization key image calculated on execution of the application. These key images can themselves be used afterwards as initialization key images for initializing the application again automatically.

If the measured error becomes too high, tracking is desynchronized and a reinitialization phase is necessary. The reinitialization phase is similar to the initialization phase described above (step 320).

It is important to note that this scheme for creating one or several key images can be repeated to create new key images corresponding to other objects also present in the image. Once the creation of at least one key image for each object is finished, it is possible to track a number of objects in the video stream.

Figure 4:
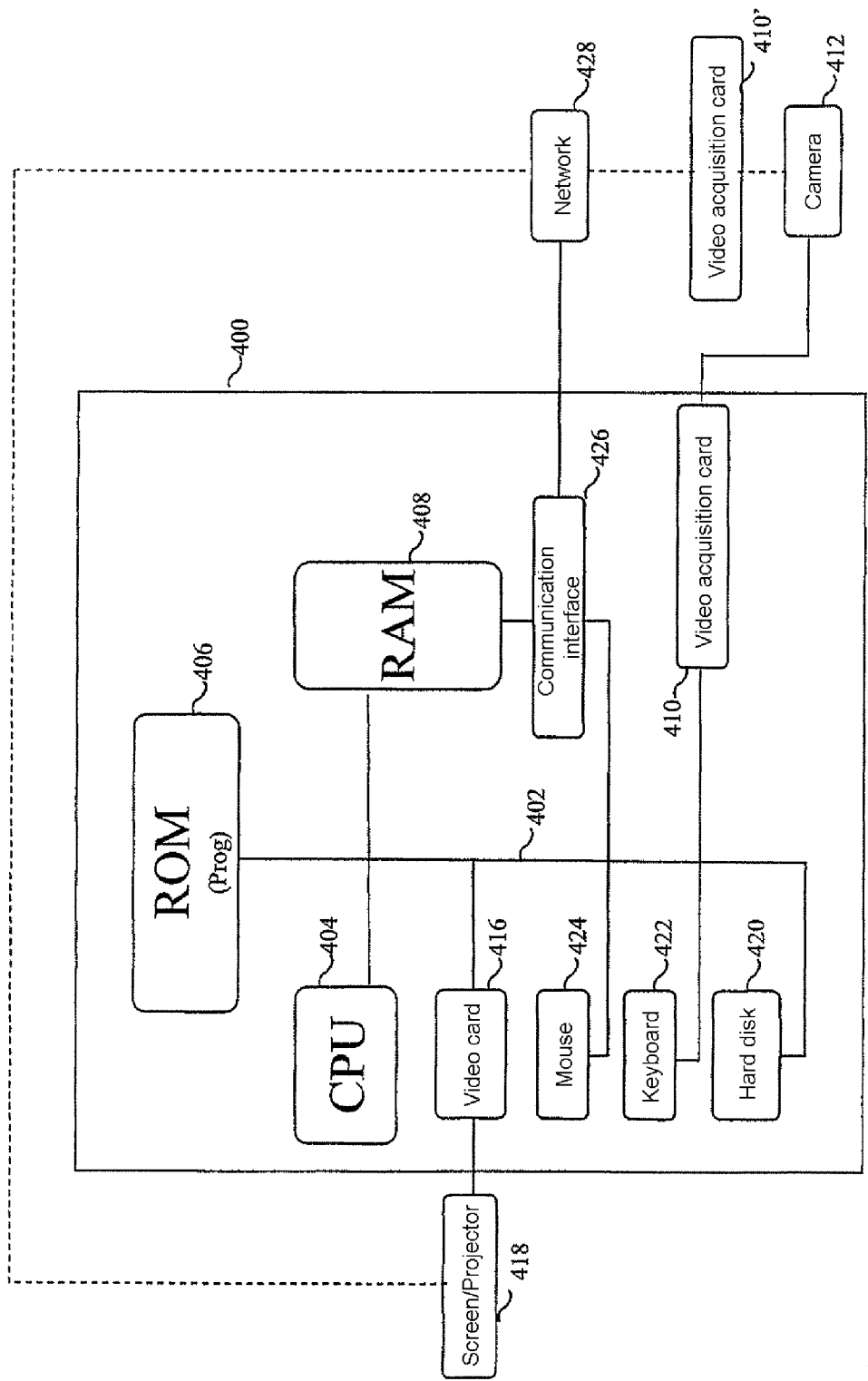
FIG. 4 shows one example of a device for implementing at least part of the invention.

FIG. 4 represents diagrammatically a device adapted to implement the invention. The device 400 is a microcomputer, a workstation or a gaming console, for example.

The device 400 preferably includes a communication bus 402 to which are connected:
- a central processor unit (CPU) or microprocessor 404;
- a read-only memory (ROM) 406 that can contain the operating system and programs ("Prog");
- a random-access memory (RAM) or cache memory 408 including registers adapted to store variables and parameters created and modified during execution of the above programs;
- a video acquisition card 410 connected to a camera 412; and
- a graphics card 416 connected to a screen or projector 418.

The device 400 can optionally also include the following:
- a hard disk 420 that can contain the aforementioned programs ("Prog") and data processed or to be processed in accordance with the invention;
- a keyboard 422 and a mouse 424 or any other pointing device such as a light 10, a touch-sensitive screen or a remote control enabling the user to interact with the programs of the invention;
- a communication interface 426 connected to a distributed communication network 428, for example the Internet, this interface being adapted to transmit and receive data;
- a data acquisition card 414 connected to a sensor (not shown); and
- a memory card reader (not shown) adapted to read or write therein data processed or to be processed in accordance with the invention.

The communication bus provides for communication and interworking between the various elements included in the device 400 or connected to it. The representation of the bus is not limiting on the invention and, in particular, the central processor unit can communicate instructions to any element of the device 400 directly or via another element of the device 400.

The executable code of each program enabling the programming device to implement the method of the invention can be stored on the hard disk 420 or in the read-only memory 406, for example.

Alternatively, the executable code of the programs could be received via the communication network 428, via the interface 426, to be stored in exactly the same way as described above.

The memory cards can be replaced by any information medium such as, for example, a compact disk (CD-ROM or DVD). As a general rule, the memory cards can be replaced by information storage means readable by a computer or by a microprocessor, integrated into the device or not, possibly removable, and adapted to store one or more programs the execution of which executes the method of the invention.

More generally, the program or programs can be loaded into one of the storage means of the device 400 before being executed.

The central processor unit 404 controls and directs the execution of the instructions or software code portions of the program or programs of the invention, which instructions are stored on the hard disk 420 or in the read-only memory 406 or in the other storage elements cited above. On power up, the program or programs that are stored in a non-volatile memory, for example the hard disk 420 or the read-only memory 406, are transferred into the random-access memory 408, which then contains the executable code of the program or programs of the invention, together with registers for storing the variables and parameters necessary to implementation of the invention.

It should be noted that the communication device including the device of the invention can equally be a programmed device. That device then contains the code of the computer program or programs, for example fixedly programmed into an application-specific integrated circuit (ASIC).

Alternatively, the image from the video card 416 can be transmitted to the screen or projector 418 via the communication interface 426 and the distributed communication network 428. Likewise, the camera 412 can be connected to a video acquisition card 410' separate from the device 400 and images from the camera 412 transmitted to the device 400 via the distributed communication network 428 and the communication interface 426.

Because of the simplification of implementation provided by the method of the invention, the key images can be created without recourse to a specialist. After the creation of a set of key images, a tracking application can be initialized on the basis of that set and used in the standard way to track an object in a sequence of images from a video stream, for example to embed a video sequence in an object from the scene taking into account the position and the orientation of that object, but also to determine the movement of a camera according to the analysis of an object from the scene. In this case, the object is part of the scene and finding the pose of that object in the scene therefore amounts to finding the pose of the camera relative to it. It then becomes possible to add virtual elements to the scene provided that the geometrical transformation between the object and the geometrical model of the scene is known. This is the case. This approach therefore augments the real scene with animated virtual objects that move as a function of the geometry of the scene.

Figure 5:
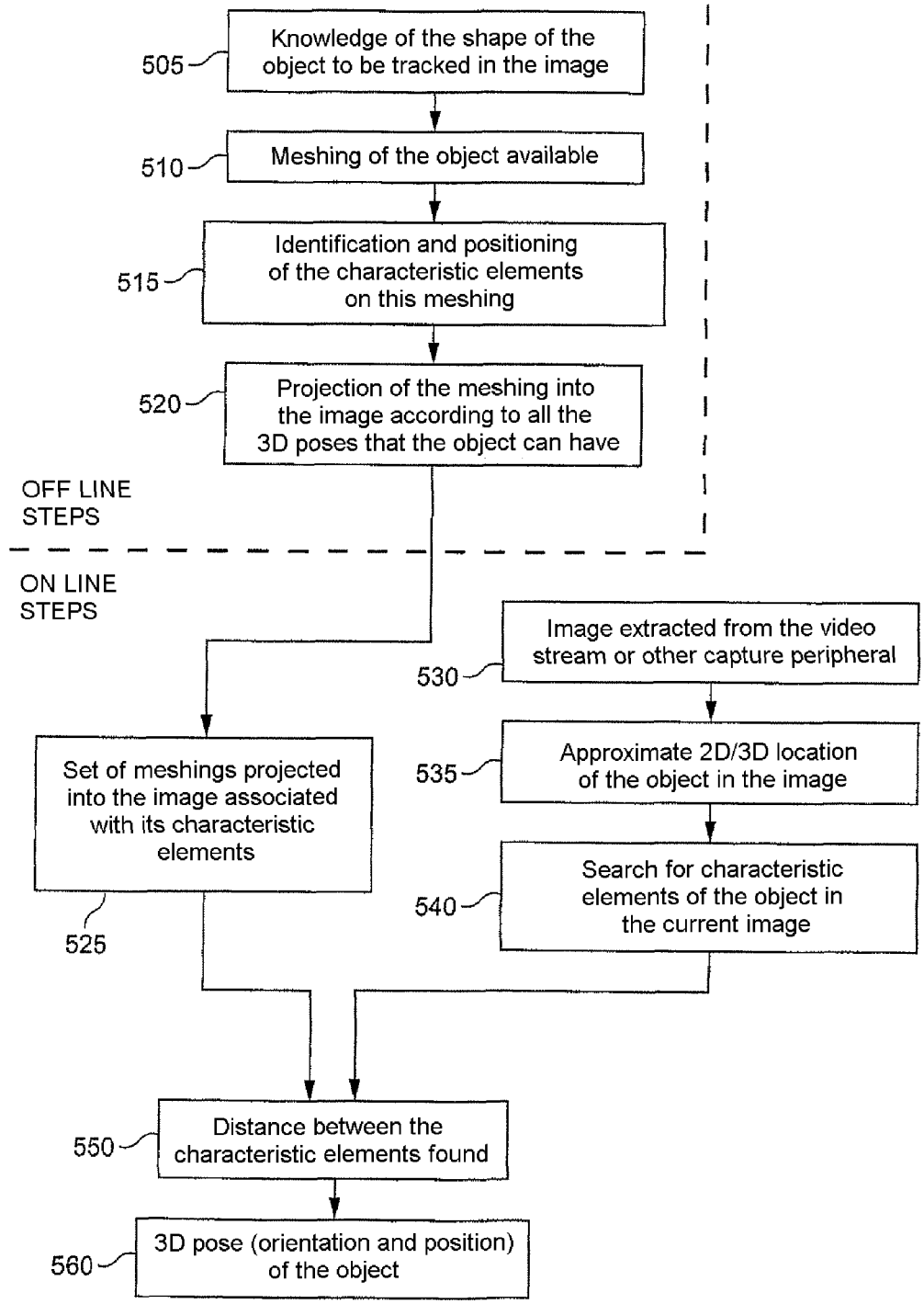
FIG. 5 shows a generic algorithm based on image analysis in accordance with the invention.

A generic algorithm of the invention using image analysis is described next with reference to FIG. 5. This algorithm comprises two phases, one of which can be executed off line and the other on line. The second phase is executed, in particular, in each phase of initialization or reinitialization of the object tracking algorithm.

The steps 505 to 520 executed off line consist firstly in obtaining the knowledge of the shape of the object to be tracked in the image (step 505). This knowledge is linked in particular to the type of object to be tracked in the video stream.

For example, this knowledge can concern one or more face objects to be located in any environment, or one or more trees in a landscape.

Then, in the step 510, the three-dimensional generic model of the object is constructed from a generic form of the real object, notably the real object to be found in the video stream, which can be the meshing of the object.

Elements characteristic of the object in this meshing are identified and positioned in the step 515, in particular by hand. With reference to the face, this refers in particular to the nose, the eyes and the mouth.

The meshing with its identified characteristic elements is then projected onto one or more two-dimensional representations and there is associated with each of these representations information as to the pose of the three-dimensional object represented (step 520). Thus each two-dimensional representation corresponds to one pose that the three-dimensional object can assume.

During this phase, the meshing is sampled in a plurality of possible positions, orientations and scales. To this end, a number of models corresponding to various random or non-random values (depending on the use) in the parameter space are constructed. These parameters are defined in particular in the three-dimensional space. This space comprises the following orientation parameters: yaw corresponds to a rotation about the axis z→φ, pitch to rotation about the axis x→θ and roll to rotation about the axis y→φ. Also, parameters can be sampled on the projection of the meshing in the image. This projection can comprise a position parameter (tx, ty) and two scale factors (sx, sy) to take account of the general shape of the object to be tracked.

Moreover, the positioning of the corresponding characteristic elements in two dimensions is associated with these representations of the generic meshing in two dimensions.

The second phase of the algorithm is executed "on line".

To this end, all the two-dimensional representations of the three-dimensional object previously generated are made available (step 525).

An image is extracted (step 530) from a stream of images coming from a video or any other capture peripheral.

In the extracted image, to simplify the search for the pose of the object in the subsequent steps, the object in the image can be localized approximately in two dimensions or three dimensions (step 535), (the size of the object in the image can yield depth information).

For example, the Haar discrete wavelet technique can be used to search the image for a model similar to that learned beforehand from hundreds of objects of the same type featuring small differences. On completion of this step, a frame is identified encompassing the objects to be searched for in the image, and possibly parts thereof, for example.

This step is followed by the step 540 of searching for the characteristic elements of the object in the image.

These characteristic elements can be points, segments or curves that are part of the object. Important information on the position and the orientation of the object can be deduced from these elements. Image analysis methods are relevant to this. For example, the following operations can be effected: analyses of gradients, determination of colorimetry thresholds in different color spaces, application of filters, for example the LoG (Laplacian of Gaussian) filter or the Sobel filter, energy minimization, in particular contour (snake) extraction taking account, for example, of the color of the object to be found in the image to find its contour in two dimensions.

From, on the one hand, the set of two-dimensional representations and, on the other hand, the image, a two-dimensional representation is selected and positioned on the object from the image to determine thereafter the pose of the object in the image (step 550). The positioning corresponds in particular to searching for a match between the two-dimensional representation and the object in the image.

The pose is determined at least from pose information associated with the selected two-dimensional representation.

The pose is also determined from the distance between the characteristic elements found.

At the end of this step, the pose of the three-dimensional object has been determined, including in particular the orientation and the position of the object.

This information is used to create an initialization key image for the application for tracking objects in real time in a video stream in the step 320 in FIG. 3.

In one embodiment, the application can find the pose of a three-dimensional object, for example a face, in a video stream in real time in order to enrich the tracked object. This kind of application functions for any "face" type object present in the video stream.

In the example considered here of the face, the user can, for example, using a monitor screen, see their face enriched with various synthetic three-dimensional objects, in particular a hat or spectacles are added to their real face. Thus the user can resemble known virtual characters or a character of their choice that they have previously modeled.

Unlike the prior art techniques which, on initialization of face tracking, extract an image from the video stream and place a meshing corresponding to a generic face by hand (step of manual creation of an initialization key image), the method of the invention places the meshing automatically on launching the application.

It is important to note that in an embodiment of this kind only one initialization key is necessary since it is created directly on initialization of the application by image analysis means. Image analysis constructs initialization key images in real time when users place themselves in front of the capture peripheral.

However, it is equally possible to create new key images either in the same way as the first key image or during the permanent regime in which the initialization key images created "on line" can be reused, for example, in the event of desynchronization, during a reinitialization phase.

Thus according to the invention the meshing corresponding to a generic face is modeled beforehand using data on the general proportions of a human face.

These proportions being very similar from one person to another, the algorithm is made more robust to different users interacting with the application.

The invention automates the initialization phase, in particular through using an image analysis solution to find certain characteristic points in the image. In the example considered, the characteristic points can be the eyes, the mouth, the nose, the eyebrows and the chin. This information, described here non-exhaustively and identified as a function of the type of application to be implemented, position the meshing corresponding to the face automatically, realistically and accurately. Any offset in the estimate of the initial positioning of the meshing on the face would be very harmful on subsequent execution of the tracking application.

Figure 6:
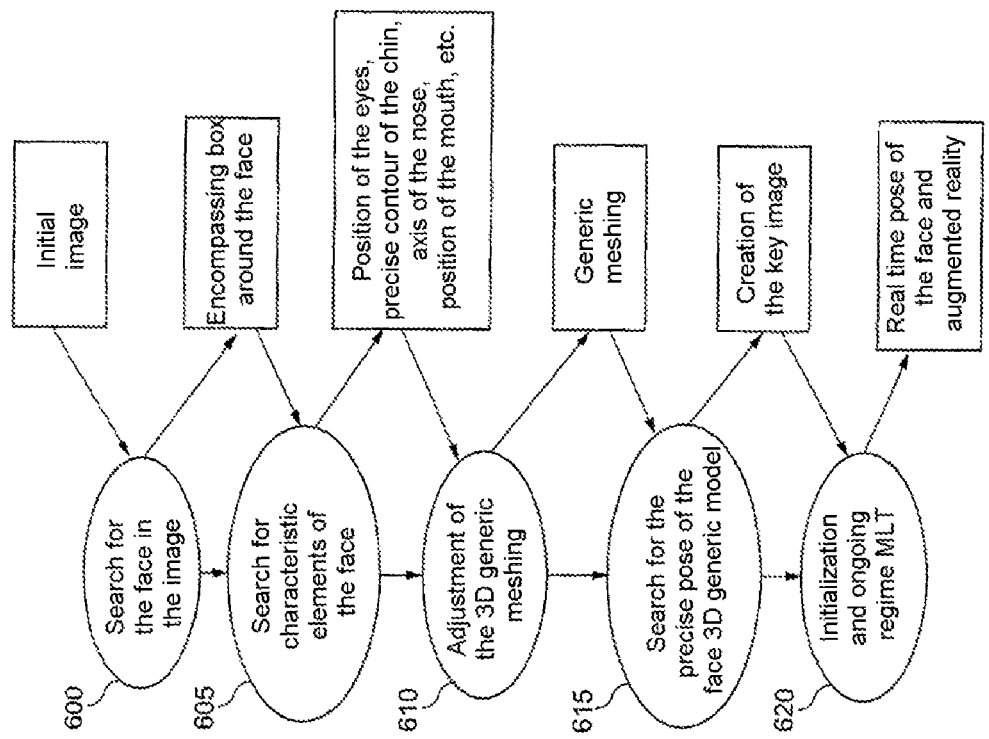
FIG. 6 shows an image analysis algorithm of the invention for creating key images of a face.

FIG. 6 shows an image analysis algorithm of the invention for creating key images of a face.

Image analysis searching firstly finds the position of a face in the images of a video stream more accurately (step 600). To this end, image analysis uses the Haar discrete wavelet technique, for example, to search the image for a model similar to that learned beforehand from hundreds of different faces. On completion of this step, there is identified a frame encompassing the face determined in the image and possibly narrower frames identifying certain characteristic areas of the face (for example around the eyes or the mouth) that will then enable a more accurate search for the elements of the face. This first approximation of the position of certain elements of the face may be insufficient to retrieve these characteristic elements accurately.

The next step (step 605) thus consists in determining more accurately in these regions characteristic points, segments and curves that belong to the face and that yield important information as to the position and the orientation of the face. It is a question, for example, of the eyes, the eyebrows, the mouth and the axis of the nose. These elements are found by means of image analysis. To this end, the following operations are effected, for example: gradient analyses, recognition of simple shapes (ovoid around the eyes), determination of colorimetry thresholds (such as those that characterize the color of a mouth), the application of filters, for example the LoG (Laplacian of Gaussian) filter (to accentuate the contours present in the face or the Sobel filter (to retrieve characteristic points), energy minimization, in particular contour (snake) extraction taking account of the color of the skin, for example.

Searching for these elements in the image can also be simplified by means of generic information on general dimensional properties of the face.

Figure 7:
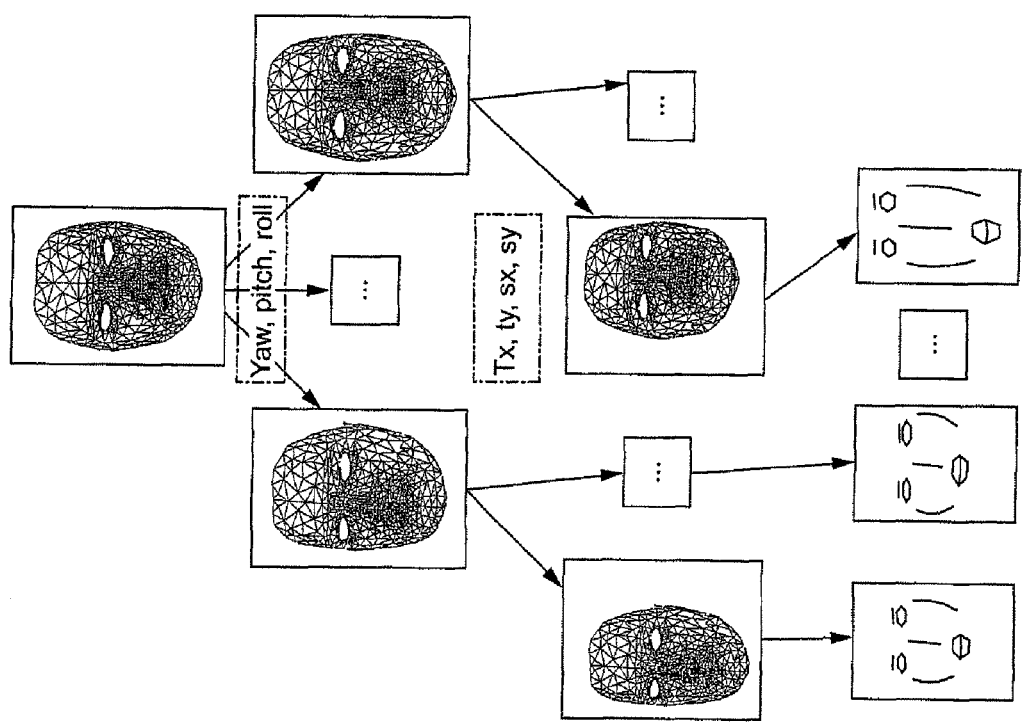
FIG. 7 shows the creation of two-dimensional models obtained from the generic three-dimensional meshing of a face.

The phase of learning the generic three-dimensional meshing in various positions and scaling with different factors is described next (FIG. 7).

During this phase, the meshing is sampled for a plurality of positions, orientations and scales. To this end, a number of models corresponding to various random or non-random values (depending on the use) are constructed in the parameter space. These parameters are defined in particular in the three-dimensional space. That space comprises the following different orientation parameters: yaw, pitch and roll. These parameters can vary very slightly. The user is considered more or less correctly positioned in front of the camera. Also, parameters can be sampled on the projection of the meshing in the image. This projection can comprise a position parameter (tx, ty) and two scale factors (sx, sy) for taking account of the general shape of the head of the user. These parameters can also vary slightly.

Thus this learning step creates a series of simplified and projected two-dimensional models obtained from generic three-dimensional meshing as shown in FIG. 7, with which three-dimensional pose parameters are associated to create key images.

Referring again to FIG. 6, the algorithm continues with adjustment of the generic meshing (step 610) and automatic searching for the pose of the three-dimensional object (step 615). To this end, the meshing is adjusted and the pose of the three-dimensional object in the image found on the basis of all the projections corresponding to the generic meshing and pertinent information on the face.

Thus the projected and simplified meshings are compared with the pertinent information on the face, namely the points, segments and curves, by means of distance functions.

Finally, a correlation operation estimates the pose and the scale of the face of the user in the initial image extracted from the video stream. All the parameters relevant to retrieving the matrix for passing between the three-dimensional generic meshing and the meshing used for tracking are known.

The pose of the face in the image extracted from the video stream being known, a first initialization key image is created. This can be used directly to enable automatic initialization of the face tracking application. Each time the user is close to the pose contained in this key image, initialization takes place. It nevertheless remains possible to create a plurality of initialization key images to enable more robust initialization in various poses of the face relative to the camera.

Furthermore, to overcome any inaccuracy on detecting the position of the important areas of the face in the image, the user can be obliged to face the camera when creating the key image, for example. This reduces the variation of the degrees of freedom during automatic searching for the pose of the object. To do this, it is also possible to add to the screen targets that force the user to take up a correct position facing the camera.

From a geometrical point of view, the transformation matrix between the initial position of the generic meshing and the modified position can be expressed by the expression: $S \cdot R \cdot T$ where S is the scaling matrix, R the rotation matrix and T the translation matrix.

It is important to note that, according to the invention, it is possible to repeat these operations of estimating the pose of the face in the image in order to find a number of users in the video stream.

Naturally, to satisfy specific requirements, a person skilled in the field of the invention can apply modifications to the foregoing description.

The invention claimed is:

1. A method for determining, in an augmented reality environment, a pose of a three-dimensional object in an image of a video stream, the method comprising:
   creating a set of two dimensional representations of the three-dimensional object, wherein the two dimensional representations include pose information, wherein the pose information includes position, orientation, and scale information of the three-dimensional object;
   acquiring a generic three-dimensional model of the three-dimensional object in the image of the video stream, wherein said three-dimensional model is a meshing of said three-dimensional object;
   identifying and positioning in the three-dimensional model at least one element characterizing the three-dimensional object in the generic three-dimensional model;
   projecting the generic three-dimensional model and the at least one element as at least one representation in two dimensions and associating with each representation in two dimensions of information on the pose of the three-dimensional object and on the position of the at least one element;
   identifying the at least one element in the image;
   selecting and positioning of a two dimensional representation from the set on the object in said image based on the identification of the element in the image;
   determining the three-dimensional pose of the object in the image from at least the pose information associated with the selected two dimensional representation; and
   automatically placing said meshing to correspond to the object in the image of the video stream for initializing a tracking of said object in the video stream for augmenting the video stream according to a displacement of the object in the video stream.

2. The method of claim 1, further comprising constructing a generic three-dimensional model of the object from the three-dimensional object.

3. The method of claim 1, further comprising locating in three dimensions of the object in the image.

4. The method of claim 1, further comprising determining the characteristic points of the object of the image.

5. The method of claim 4, further comprising determining characteristic points of the generic three-dimensional model of the object.

6. The method of claim 5, wherein determining the three-dimensional pose of the object in the image is a function of the distance between the characteristic points of the generic three-dimensional model of the object so determined and the characteristic points of the object in the image so determined.

7. A method for creating, in an augmented reality environment, at least one key image comprising an image representing at least one three-dimensional object in a three-dimensional environment, the method comprising:
 acquiring at least one image representing the object in a particular initial position;
 determining the pose of the three-dimensional object in said at least one image by the method according to claim 1 for determining of the pose of a three-dimensional object in an image; and
 creating at least one key image from said at least one image acquired and the relative pose of the object in its environment.

8. A non-transitory computer-readable storage medium storing instructions that when executed by a computer cause the computer to perform a method for determining, in an augmented reality environment, a pose of a three-dimensional object in an image of a video stream, the method comprising:
 creating a set of two dimensional representations of the three-dimensional object, wherein the two dimensional representations include pose information, wherein the pose information includes position, orientation, and scale information of the three-dimensional object;
 acquiring a generic three-dimensional model of the three-dimensional object in the image of the video stream, wherein said three-dimensional model is a meshing of said three-dimensional object;
 identifying and positioning in the three-dimensional model at least one element characterizing the three-dimensional object in the generic three-dimensional model;
 projecting the generic three-dimensional model and the at least one element as at least one representation in two dimensions and associating with each representation in two dimensions of information on the pose of the three-dimensional object and on the position of the at least one element;
 identifying the at least one element in the image;
 selecting and positioning of a two dimensional representation from the set on the object in said image based on the identification of the element in the image;
 determining the three-dimensional pose of the object in the image from at least the pose information associated with the selected two dimensional representation; and
 automatically placing said meshing to correspond to the object in the image of the video stream for initializing a tracking of said object in the video stream for augmenting the video stream according to a displacement of the object in the video stream.

9. A computer-readable storage medium storing instructions that when executed by a computer cause the computer to perform a method for creating, in an augmented reality environment, at least one key image, the method comprising:
 acquiring at least one image representing the object in a particular initial position;
 determining the pose of the three-dimensional object in said at least one image by the method according to claim 1 for determining the pose of a three-dimensional object in an image; and
 creating at least one key image from said at least one image acquired and the relative pose of the object in its environment.

10. A device for determining, in an augmented reality environment, the pose of a three-dimensional object in an image of a video stream, comprising: a processor; and a memory coupled to the processor; wherein the processor executes a program code stored in the memory to:
 create a set of two dimensional representations of the three-dimensional object, wherein the two dimensional representations include pose information, wherein the pose information includes position, orientation, and scale information of the three-dimensional object;
 acquire a generic three-dimensional model of the object in the image of the video stream, wherein said three-dimensional model is a meshing of said three-dimensional object;
 identify and position in the three-dimensional model at least one element characterizing the three-dimensional object in the generic three-dimensional model;
 project the generic three-dimensional model and the at least one element as at least one representation in two dimensions and associate with each representation in image; two dimensions of information on the pose of the three-dimensional object and on the position of the least one element;
 identify the at least one element in the image;
 select and position a two dimensional representation from the set on the object in said image based on the identification of the element in the
 determine the three-dimensional pose of the object in the image from at least the pose information associated with the selected two dimensional representation; and
 automatically place said meshing to correspond to the object in the image of the video stream for initializing a tracking of said object in the video stream for augmenting the video stream according to a displacement of the object in the video stream.

11. The device according to claim 10, wherein the processor is further configured to execute the program code stored in the memory to construct a generic three-dimensional model of the object from the three-dimensional object.

12. The device according to claim 10, wherein the processor is further configured to execute the program code stored in the memory to locate in three dimensions of the object in the image.

13. The device according to claim 10, wherein the processor is further configured to execute the program code stored in the memory to determine the characteristic points of the object of the image.

14. The device according to claim 13, wherein the processor is further configured to execute the program code stored in the memory to determine characteristic points of the generic three-dimensional model of the object.

15. The device according to claim 14, wherein the processor is further configured to execute the program code stored in the memory to determine the three-dimensional pose of the object in the image as a function of the distance between the characteristic points of the generic three-dimensional model of the object so determined and the characteristic points of the object in the image so determined.

16. A device for creating, in an augmented reality environment, at least one key image comprising an image representing at least one three-dimensional object in a three-dimensional environment, the device comprising:
a processor; and
a memory coupled to the processor;
wherein the processor executes a program code stored in the memory to:
acquire at least one image representing the object in a particular initial position;
determine the pose of the three-dimensional object in said at least one image conforming to the device according to claim 10 for determination of the pose of a three-dimensional object in an image, and
create at least one key image from said at least one image acquired and the relative pose of the object in its environment.

* * * * *